United States Patent [19]
Cameron

[11] Patent Number: 5,309,078
[45] Date of Patent: May 3, 1994

[54] SYNCHRONOUS RECTIFICATION METHOD FOR REDUCING POWER DISSIPATION IN MOTOR DRIVERS IN PWM MODE

[75] Inventor: Scott W. Cameron, Milpitas, Calif.

[73] Assignee: SGS-Thomson Microelectronics, Inc., Carrollton, Tex.

[21] Appl. No.: 728,597

[22] Filed: Jul. 11, 1991

[51] Int. Cl.$^5$ .................................................. H02P 5/40
[52] U.S. Cl. ................................ 318/811; 363/127
[58] Field of Search .................... 318/599, 811, 696; 388/811, 819; 363/81, 84, 87, 127, 89, 126

[56] References Cited

U.S. PATENT DOCUMENTS

| | | | |
|---|---|---|---|
| 3,940,682 | 2/1976 | Park et al. | 363/127 |
| 4,346,434 | 8/1982 | Morinaga | 318/809 |
| 4,371,818 | 2/1983 | Lewis | 388/811 |
| 4,447,868 | 5/1984 | Turnbull | 363/81 |
| 4,488,103 | 12/1984 | Morinaga et al. | 318/811 |
| 4,875,148 | 10/1989 | Roe et al. | 363/41 |
| 4,879,502 | 11/1989 | Endo et al. | 318/808 |
| 4,884,183 | 11/1989 | Sable | 318/811 |
| 4,926,104 | 5/1990 | King et al. | 318/599 |
| 4,984,147 | 1/1991 | Araki | 363/127 |
| 5,032,780 | 6/1991 | Hopkins | 318/696 |
| 5,140,514 | 8/1992 | Tuusa et al. | 363/127 |

Primary Examiner—William M. Shoop, Jr.
Assistant Examiner—John W. Cabeca
Attorney, Agent, or Firm—Richard A. Bachand; Lisa K. Jorgenson; Richard K. Robinson

[57] ABSTRACT

Pulse Width Modulation (PWM) techniques, often used to reduce the power dissipation in polyphase motors, chop the current in the coils of the motor at their peak current levels, to achieve maximum torque, to allow rapid accelerations, and to reduce the power dissipated in the chip to a level proportional to the duty cycle. During the time the current is switched off, the current which has been established in the coils of the motor is allowed to be dissipated. Accordingly, when the switching transistors of the active coils are turned off during PWM mode chopping, a non-rectifying ground return path is provided for flyback energy in the active driving coil. This non-rectifying ground return path is provided by switching transistors in parallel with flyback diodes, operated in a form of synchronous rectification. This gives an alternate current path for the coil current to reduce the voltage drop across the diodes, and thereby reduce the power dissipation and heat in the chip.

19 Claims, 2 Drawing Sheets

SYNCHRONOUS RECTIFICATION METHOD FOR REDUCING POWER DISSIPATION IN MOTOR DRIVERS IN PWM MODE

BACKGROUND OF THE INVENTION

1. Field of the Invention

This invention relates to improvements in circuitry for driving polyphase motors, and more particularly to improvements in circuitry for driving polyphase motors in a PWM mode in which the power dissipation requirements of the circuitry is reduced.

2. Description of the Prior Art

Pulse Width Modulation (PWM) techniques, often used to reduce the power dissipation in polyphase motors, chop the current in the coils of the motor at their peak current levels, to achieve maximum torque, to allow rapid accelerations, and to reduce the power dissipated in the chip to a level proportional to the duty cycle. In the past, during this Chopping, the transistors which control the current to the currently active coils of the motor, are switched on and off in a network of switching transistors. During the time the current is switched off, the current built up in the coils is allowed to be dissipated through fly back diodes in parallel with the transistors associated with the active coils. Nevertheless, a voltage drop still exists across the fly back diodes, as the coil current flows through them to dissipate power in the form of heat. This heat, of course, creates a problem which needs to be controlled.

SUMMARY OF THE INVENTION

In accordance with one embodiment of the invention, the switching transistors of the active coils are turned off during PWM chopping, but other transistors are turned on in a configuration in parallel with the flyback diodes, in a form of synchronous rectification. This gives an alternate current path for the coil current, further reduces the voltage drop across the diodes, and thereby reduces the power dissipation and heat in the chip.

In accordance with a broad aspect of the invention, a circuit for operating a polyphase motor of the type having a plurality of driving coils is presented. The circuit includes circuitry for operating the motor in normal and PWM modes, and a non-rectifying return path for flyback energy in an active driving coil when a switch which provides supply voltage to the active driving coil is turned off in the PWM mode. The non-rectifying return path can be a resistive path, for example, that of a current flow path of a switching transistor. Switching circuitry is further included for activating the switching transistor synchronously with the rotation of the motor, in the PWM mode. The circuitry can be incorporated, if desired, in a discrete or integrated motor driving circuit.

BRIEF DESCRIPTION OF THE DRAWINGS

The invention is illustrated in the accompanying drawings, in which.

In the various figures of the drawing, like reference numerals are used to denote like or similar parts. Also, within the individual figures of the drawing, like or similar parts are denoted by like reference numerals differentiated by a prime (') or double prime (") symbol.

DETAILED DESCRIPTION OF THE PREFERRED EMBODIMENT

Figure 1:
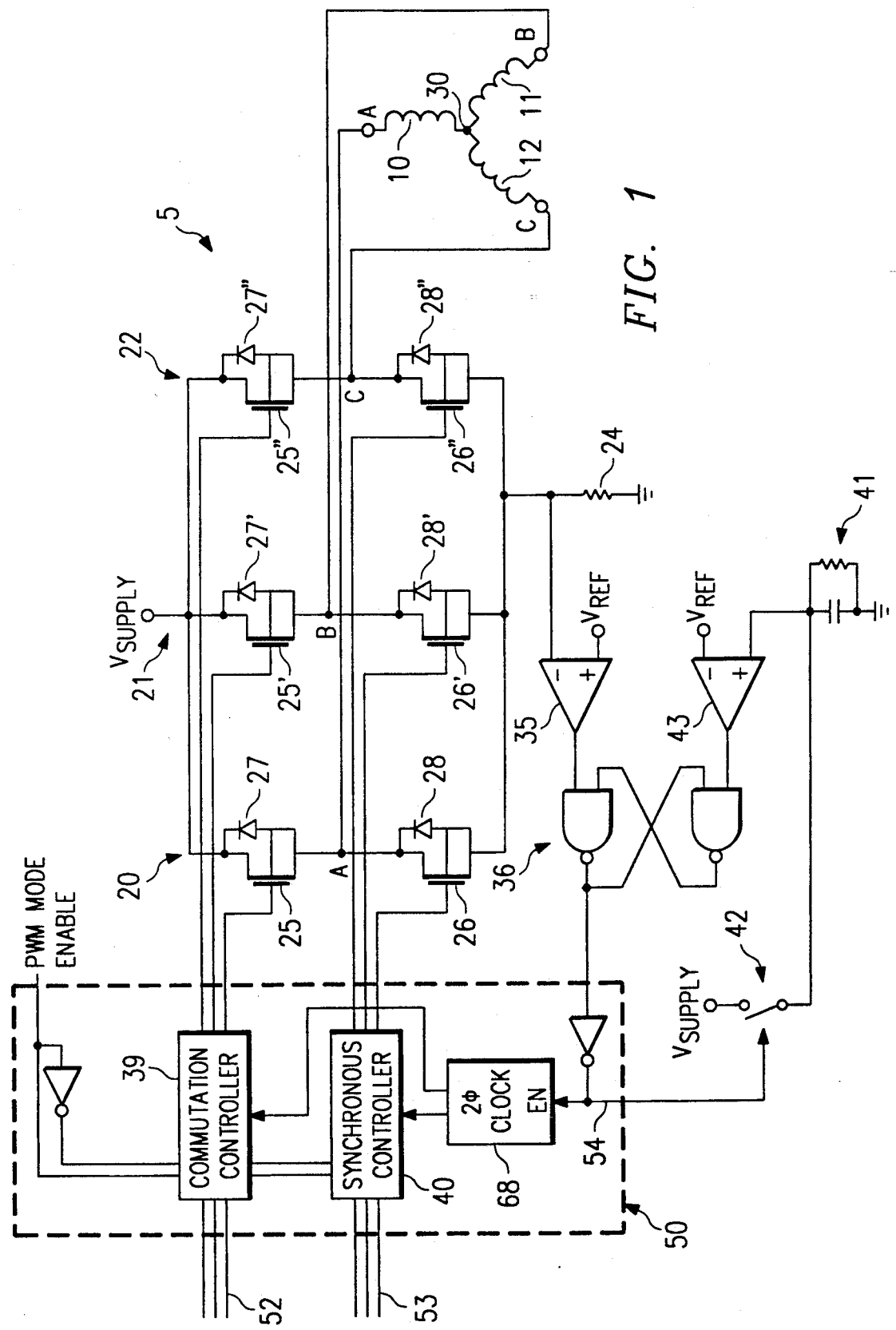
FIG. 1 is an electrical schematic diagram of a motor system incorporating apparatus illustrating the concept, in accordance with a preferred embodiment of the invention.

A part of a three phase motor system driven by a conventional H-bridge 5, commonly referred to as a triple-½-H-bridge, is shown in FIG. 1. It should be noted that although a preferred embodiment of the invention is described with regard to a three phase motor, in particular, the principles of the invention can be equally advantageously applied to polyphase motors, in general. The H bridge 5 is used to switchably provide driving current to various stator coils 10, 11, and 12, connected in "Y" configuration, as shown. Thus, three series current paths 20, 21, and 22 are provided between a source of dc voltage, V, and ground, each current path including a sense resistor 24, and, respectively, two switching transistors 25 and 26, 25' and 26', and 25" and 26". The transistors 25, 25', 25", 26, 26' and 26" can be of known power switch FETS, or other switch devices, as desired. The stator coils 10, 11, and 12 are connected at one end 30 to each other, and at their respective other ends to nodes A, B, and C between the respective pairs of switching transistors 25–26; 25'–26' and 25"–26". Each of the switching transistors 25, 26, 25', 26', 25", and 26" has a flyback diode 27, 28; 27', 28'; and 27", 28" connected in parallel with its current path, as shown.

The voltage across the sense resistor 24 and a reference voltage, $V_{REF}$, are connected respectively to the inverting and noninverting inputs of an amplifier 35. The output of the amplifier 35 is connected to a flip-flop circuit 36, the inverted output of which being applied to enable a 2-phase non-overlapping clock 68. The outputs of the 2-phase non-overlapping clock 68 are connected to a synchronous controller 39 and a commutation controller 39. The commutation controller 39 provides switching signals to the upper switching transistors 25, 25' and 25", and the synchronous controller 40 provides switching signals to the lower switching transistors 26, 26', and 26".

In operation, during an energized phase, one node (for example, node A) is driven high by one of the upper switches 25. One node (for example, node B) is driven low by one of the lower switches 26', and the other node (for example, node C) is left floating with both switches 25" and 26" off. This is commonly referred to as the "AB phase". The coils are then switched in a commutation sequence that maintains the current in one coil during switching.

During PWM mode the current is sensed across the sense resistor 24, and is compared to the reference voltage, $V_{REF}$, which determines the maximum current capable of being developed in the coils 10, 11, and 12. As the current reaches the reference voltage, $V_{REF}$, the output of the comparator 35 flips its output to set the flip-flop 36 and shuts off the upper switches 25, 25', and 25", across all output nodes A, B, and C. Simultaneously a capacitive discharge circuit including an RC network 41 is enabled by opening a switch 42. The discharge circuit 41 creates the time delay during which the upper drivers 25, 25' and 25" are off. When the voltage on the capacitor of the discharge circuit 41 falls below the reference voltage, a second comparator 43 toggles the flip-flop 36 turning the upper driver, which corresponds to the phase being driven, back on again. The current then ramps up and the cycle repeats itself.

Again, using the AB phase example, during the ON time, the current across the coils 10 and 11 between nodes A and B is ramping up, increasing the $IR_{ON}$ drop across the selected transistor switch 25. The transistor switch 25 during this time appears like a resistor, as does the corresponding lower transistor switch 26'. Then, when the upper switch 25 is shut off in the PWM chop cycle operation, the flyback diode 28 in parallel with the lower transistor switch 26 must forward bias in order to maintain the current in the coils 10 and 11. The lower transistor switch 26' remains on.

Furthermore, when the PWM chop cycle shuts off the upper transistor switch 25, the coils 10 and 11 turn into a decaying current source (acting like a supply), and the energy stored in them must be dissipated. The coils, therefore, pull current through the flyback diode 28 of the lower transistor switch 26, forward biasing the diode 28. This results in a forward drop of approximately about 1.5 V at typical operating currents of about 2.5 A.

In accordance with the invention, however, a non-rectifying return path for the flyback energy in the active driving coil is provided by applying a drive voltage to the lower transistor 26 when voltage to the active driving coil is turned off in said PWM mode.

Thus, the power dissipation during the OFF time would normally be equal to the sum of $(I_{COIL}^2)(R_{(B)on})+(Ir_{COIL})(1.5\ V)$, where $R_{(B)on}$ is the resistance of the lower transistor switch 26', and $I_{COIL}$ is the current in the coils 10 and 11. However, according to the invention, if, when the upper transistor switch 25 is shut off, the lower transistor switch 26 is turned on, then the circuit would appear as if the coils 10 and 11 were shorted through two resistors, and no diode. The switching of the lower transistor switches 26, 26', and 26'' is accomplished with a synchronous controller circuit 40, in synchronism with the signals developed by the commutation controller 30, as below described in detail.

In this situation, the power dissipation is merely the sum of the IR drops:

$$(I^2_{COIL})(R_{(A)on}) + (I^2_{COIL})(R_{(B)on}),$$

where $(R_{(A)on})$ is the resistance of the lower transistor switch 26 and $(R_{(B)on})$ is the resistance of the lower transistor switch 26'.

Comparing the two power dissipations, with real numbers:

power dissipated
with no synchronous = $I_{COIL}(R_{(B)ON}I_{COIL} + 1.5V)$ (1)
rectification power dissipated
with synchronous = $I^2_{COIL}(R_{(A)ON} + R_{(B)ON})$ (2)
rectification A typical resistance for a switching transistor, such as might be employed for the lower switching transistors 26, 26', or 26'' is typically about 0.2 ohms, and typical coil current is on the order of about 2.5 amperes.

Therefore, according to formula (1) above, (1) power dissipated w/o synchronous rectification: $= 2.5\ A[(0.2\Omega)(2.5\ A)+1.5\ V]=5.0$ Watts (2) power dissipated with synchronous rectification: $=(2.5\ A)^2(0.4\Omega)=2.5$ Watts.

It can be seen that this results in a power savings of about 50%.

Figure 2:
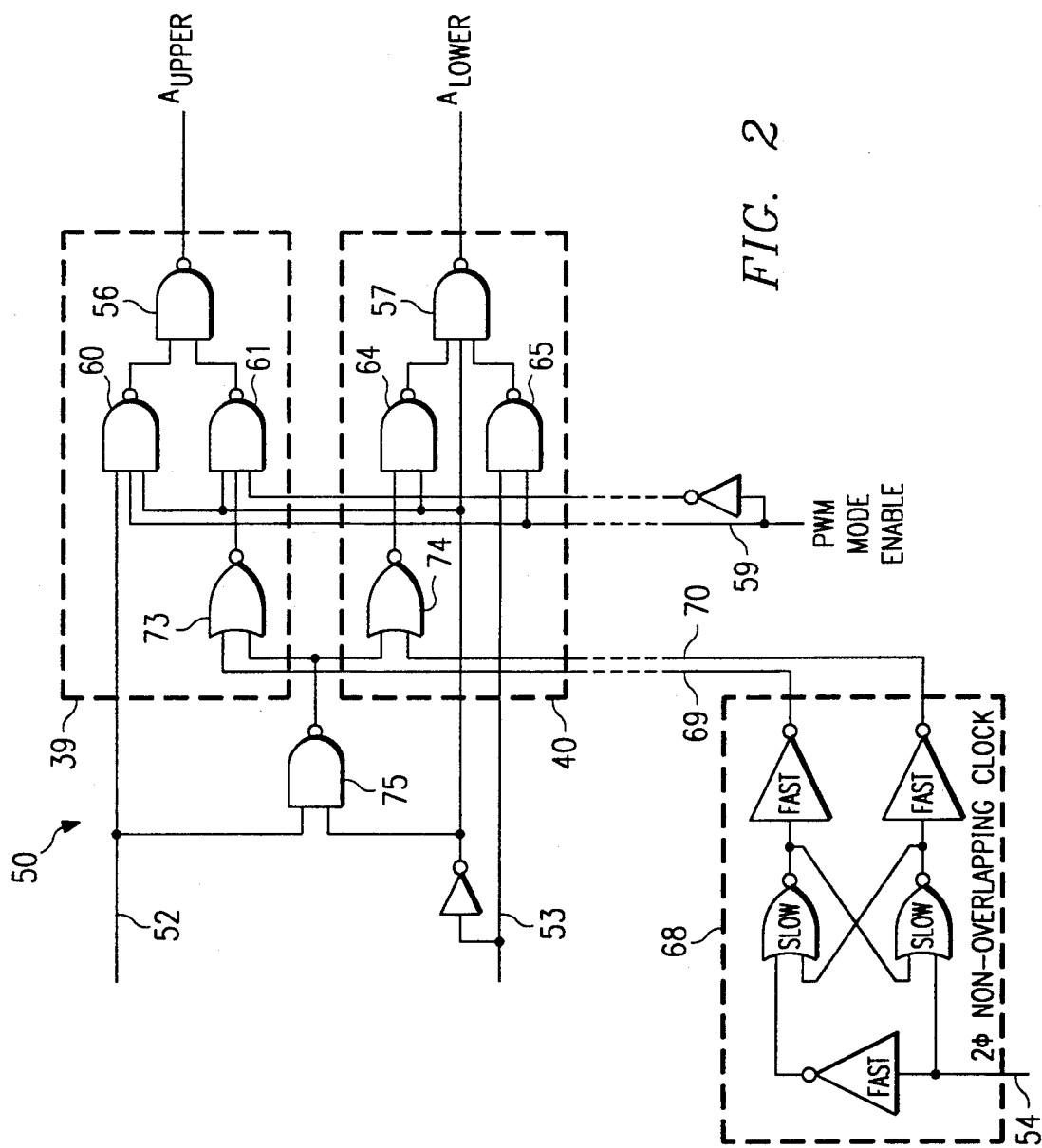
FIG. 2 is an electrical schematic diagram, in greater detail, of a portion of the commutation and synchronous controllers of FIG. 1 for controlling one phase of the motor system, in accordance with a preferred embodiment of the invention.

Details of a portion of the controller circuitry 50 of the motor driver circuitry 5 which is contained within the dotted line box 50 of the schematic diagram of FIG. 1 is shown in the electrical schematic diagram of FIG. 2. The portion of the controller circuitry 50 illustrated is for one phase of the motor driver circuitry, it being understood that similar circuitry, not described in detail herein, is provided for the remaining phases. The controller circuitry 50 is a logic circuit connected to receive motor control signals on lines 52 and 53 from a motor control circuit (not shown) for the respective upper and lower drive circuitry, in a manner similar to prior motor control systems. The other inputs to the control circuitry 50 are on the line 59, on which PWM enable signals control the mode of the circuit between normal (or linear) and PWM modes, and signals on line 54 from the flop-flop 36, shown in FIG. 1.

The output from the controller circuitry 50 to the gate of the upper switching transistor 25 is derived from the output of a NAND gate 56. In like manner, the output for the gate of the lower switching transistor 26 is provided by the output of NAND gate 57.

The determination whether operation is in normal (or linear) or in PWM mode is controlled within the circuitry 50 by NAND gates 60, 61, 64, and 65. To this end, NAND gates 60 and 65 receive the uninverted signal on line 59, as well as the motor control signals on lines 52 and 53, and consequently, allow the motor to be operated in the normal mode. On the other hand, the NAND gates 61 and 64 receive an inverted input on line 59, and are therefore operative in the PWM mode. To assure that in the PWM mode both the upper and lower switching transistor drives are not simultaneously active, the 2-phase clock 68 is provided having two output lines 69 and 70 which carry exclusively out of phase clock signals. As will become apparent, the 2-phase clock 68 operates to turn on and off the upper driver and off and on the lower driver.

Thus, the output lines 69 and 70 from the 2-phase clock 68 are connected to a pair of NOR gates 73 and 74 which provide controlling outputs to respective NAND gates 61 and 64. The NOR gates 73 and 74 also receive the motor control signal on line 52, as well as an inverted motor control signal from line 53, via NAND gate 75. The inverted signal from the motor control line 53 is also connected to NOR gates 61 and 60. Consequently, in PWM mode, if the upper driver transistor 25 in FIG. 1 is on, it will be toggled (or duty cycled) on and off by the 2-phase clock 68. However, if the lower driver 26 is on, it is not desired to duty cycle it. So if the lower driver 26 is on in Pwm mode, the 2-phase clock 68 will be disabled by the inverted signal taken from the lower line 53.

In normal (or linear) operation, when the circuitry driving the first channel (the channel of node A, including driver transistors 25 and 26 in FIG. 1) is active, as determined by the motor control signals on lines 52 and 53, drive voltage is provided to the upper switching transistor 25 on the output from NAND gate 56, and to the lower switching transistor 26' from a NAND gate in the corresponding logic circuitry of its respective channel (not shown). In this configuration, the output of the 2-phase clock 68 is blocked by the NOR gates 73 and 74. On the other hand, when the signal on line 59 changes state in the PWM mode, the signal path is changed from the outer NAND gates 60 and 65 to the inner NAND gates 61 and 64. In this mode, the circuit provides toggled drive voltage to switching transistors 25 and 26 from the output of NAND gates 56 and 57. In this mode, however, when the drive voltage to the upper switching transistor 25 from NAND gate 56 is off due to the operation of the 2-phase clock, the drive voltage to the lower switching transistor 26 is on. The drive voltage to the lower switching transistor in the adjacent channel containing node B, also remains on.

Thus, there are three modes of operation enabled by the circuitry described above. First is the normal, linear mode of operation, in which there is no PWM operation. The second is in PWM mode, when either the upper or lower driver is on. Within this second mode, If the upper driver is on, then the 2-phase clock 68 causes duty cycling of the upper and lower drivers. If the lower driver is on, then the 2-phase clock 68 is disabled. The third mode is when both the upper and lower driver &re off in PWM mode, and there is no duty cycling.

The operation is sequenced among the various other motor phases, as known in the art, with operation modified as described above.

Although the invention has been described and illustrated with a certain degree of particularity, it is understood that the present disclosure has been made by way of example only, and that numerous changes in the combination and arrangements of parts and features can be made by those skilled in the art without departing from the spirit and scope of the invention, as hereinafter claimed.

I claim:

1. A circuit for operating a polyphase motor having a plurality of driving coils, comprising:
   circuitry for operating said motor in normal and PWM modes,
   and a switched flyback current path for flyback energy in an active driving coil synchronously switched when a switch which provides supply voltage to said active driving coil is turned off in said PWM mode.

2. The circuit of claim 1 wherein said non-rectifying flyback current path comprises a resistive path.

3. The circuit of claim 2 wherein said resistive path comprises a current flow path of a switching transistor.

4. The circuit of claim 3 further comprising switching circuitry for activating said switching transistor synchronously with the rotation of said motor, in said PWM mode.

5. The circuit of claim 1 wherein said non-rectifying flyback current return path comprises a plurality of switching transistors, and further comprising switching circuitry for activating said switching transistors synchronously with the rotation of said motor, in said PWM mode.

6. A system for driving a polyphase motor having a plurality driving coils, comprising:
   a plurality of sets of top and bottom switches, the top switch of each set being connected on one side to a supply voltage, and the bottom switch of each set being connected on one side to another side of the top switch of its respective set, and to a respective one of said driving coils, and being connected on another side to a reference potential;
   a plurality of diodes in parallel with respective top and bottom switches;
   a commutation controller for controlling said top and bottom switches, whereby said coils are switched in commutation sequences in which current flows through two coils in each commutation sequence, and one of said two coils is selected to be included in a next succeeding commutation sequence; and
   a circuit connected to operate said bottom switches, wherein when a top switch is shut off in a PWM mode, the bottom switches in the set of switches of the current sequence and in the set of switches of the next succeeding sequence are turned on.

7. The system claim 6 wherein said switches are switching transistors.

8. The system claim 7 wherein said switching transistors are power switch FETS.

9. The system of claim 6 wherein said circuit to operate said bottom switches when a top switch is shut off in a PWM mode, comprises:
   a sense resistor, connected between said another end of each of said bottom switches and ground to place said reference potential on said bottom switches,
   a sense circuit for producing an output signal when a voltage on said sense resistor exceeds a reference voltage; and
   a gate circuit having first and second inputs, said first inputs connected to receive said output signal of said sense circuit, and having an output connected to said top switches.

10. The system of claim 9 wherein said motor is a three phase D-C motor.

11. The system of claim 10 wherein said three phase D-C motor is a brushless, sensorless three phase D-C motor.

12. A system for driving a three phase motor of the type having driving coils connected in a "Y" configuration, comprising:
   a bridge having three series current paths between a source of dc voltage and ground, each of said series current paths including a sense resistor and including upper and lower switching transistors, a connection node between which being connected to respective ones of said coils;
   a plurality of flyback diodes, each connected in parallel with a respective one of said upper and lower switching transistors;
   an amplifier for comparing a reference voltage with a voltage of said sense resistor for producing an output when said voltage on said sense resistor exceeds said reference voltage;
   a flip-flop controlled by said output of said amplifier;
   a gate circuit having first inputs connected to receive an output of said flip-flop, and having an output connected to said upper switching transistors;
   a commutation controller having outputs connected to respective second inputs of said gate circuit for controlling said upper switching transistors in conjunction with said output of said flip-flop, whereby said coils are switched in commutation sequences in which current flows through two coils in each commutation sequence, and one of said two coils is selected to be included in a next succeeding commutation sequence; and
   a circuit connected to operate said lower switching transistors, wherein when the upper switching transistor in a series current path is shut off in a PWM mode, the lower switching transistors in both the same series current path and the series current path of the next succeeding sequence are turned on.

13. The system claim 12, wherein said switching transistors are power switch FETS.

14. The system of claim 12 wherein said bridge is a triple-½-H-bridge.

15. The system of claim 12 wherein said motor is a sensorless, brushless three-phase DC motor.

16. A method for operating a polyphase motor having a plurality of driving coils, comprising:
    providing circuitry for operating said motor in normal and PWM modes,
    switching a flyback current path for flyback energy in an active driving coil in synchronism with when a switch which provides supply voltage to said active driving coil is turned off in said PWM mode.

17. The method of claim 16 wherein said step of providing a non rectifying flyback current path comprises providing a resistive path.

18. The method of claim 17 wherein said step of providing a resistive path comprises providing a current flow path of a switching transistor.

19. The method of claim 16 further comprising providing switching circuitry for providing said non-rectifying flyback current path synchronously with the rotation of said motor, in said PWM mode.

* * * * *